Sept. 4, 1923. 1,466,885
E. H. MEDÉN
LIGHT OPERATED CONTROLLER
Filed May 25, 1922   2 Sheets-Sheet 1
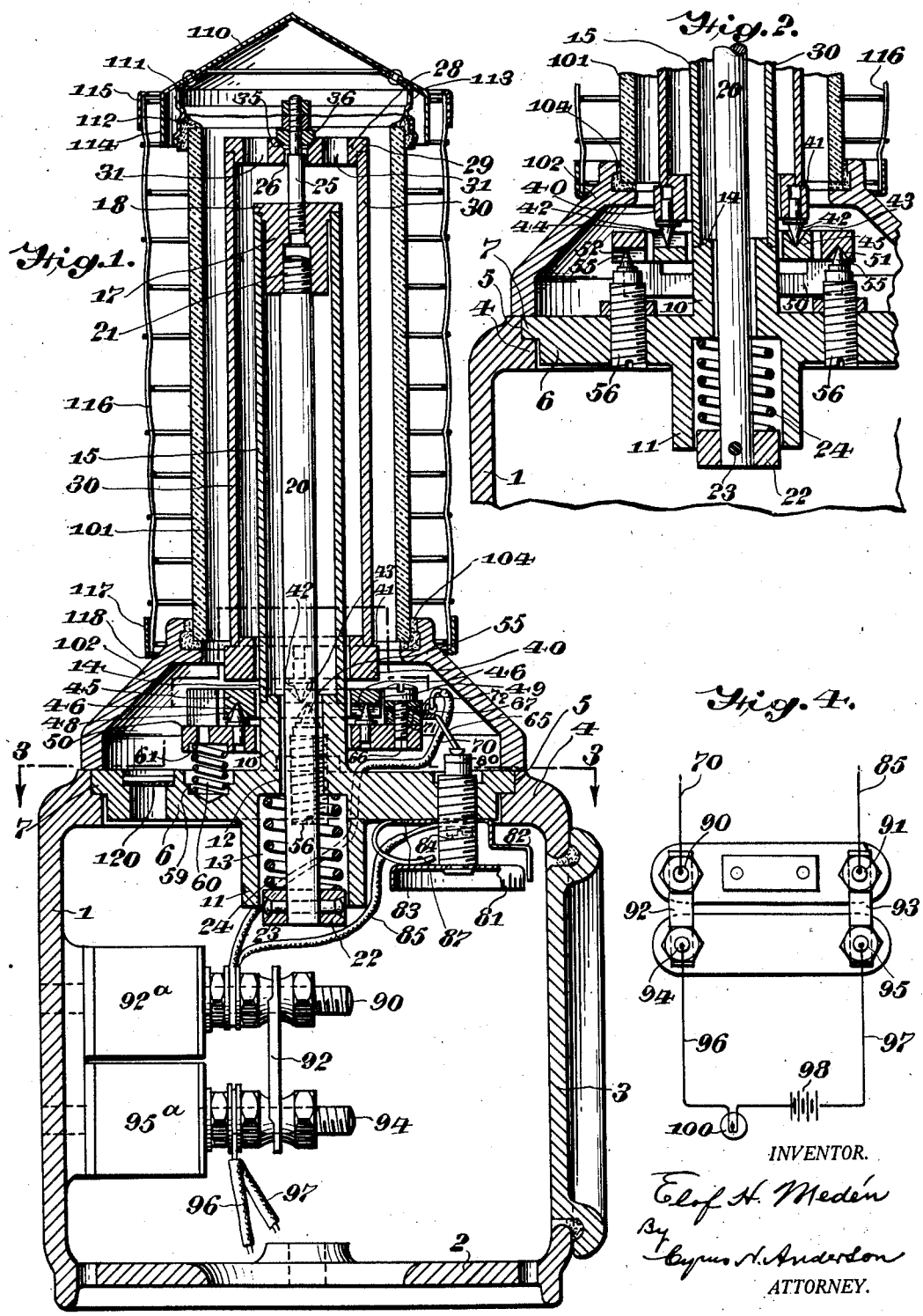
INVENTOR.
Elof H. Medén
By Cyrus N. Anderson
ATTORNEY.

Sept. 4, 1923.  
E. H. MEDÉN  
1,466,885  
LIGHT OPERATED CONTROLLER  
Filed May 25, 1922  
2 Sheets-Sheet 2
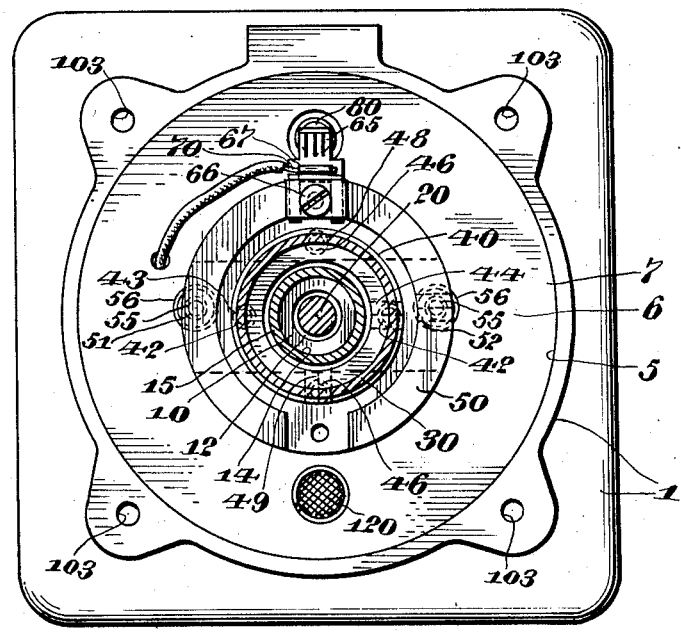
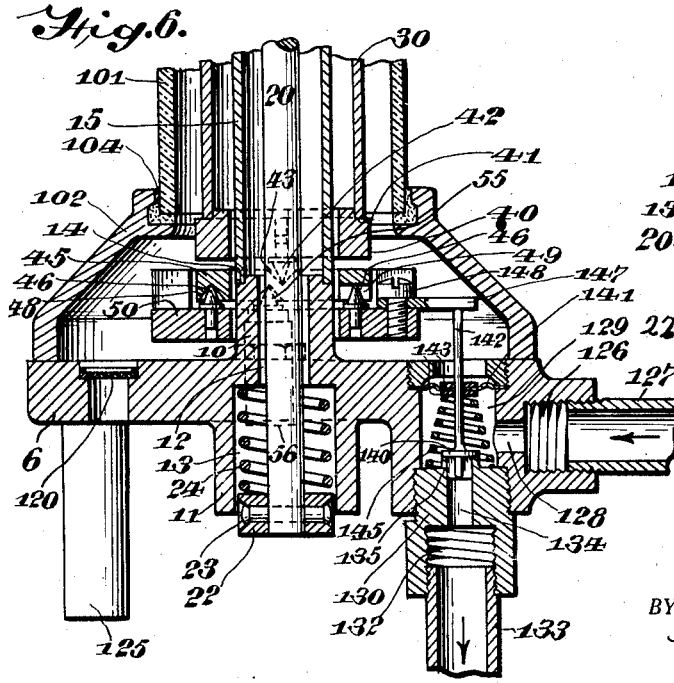
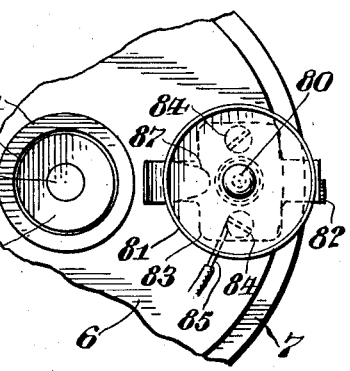
INVENTOR.  
Elof H. Medén  
BY  
Cyrus N. Anderson  
ATTORNEY.

Patented Sept. 4, 1923.

1,466,885

UNITED STATES PATENT OFFICE.

ELOF H. MEDÉN, OF SHORT HILLS, NEW JERSEY, ASSIGNOR TO AMERICAN GAS-ACCUMULATOR COMPANY, OF ELIZABETH, NEW JERSEY, A CORPORATION OF NEW JERSEY.

LIGHT-OPERATED CONTROLLER.

Application filed May 25, 1922. Serial No. 563,746.

*To all whom it may concern:*

Be it known that I, ELOF H. MEDÉN, a subject of the King of Sweden, and a resident of Short Hills, in the county of Union and State of New Jersey, have invented an Improvement in Light-Operated Controllers, of which the following is a specification.

My invention relates to means which is adapted to operate under the influence of light to actuate a member or members for any desired purpose for which the device may be adapted. In the present application I have illustrated the invention as embodied in means for controlling a conduit for the transmission of an electric current or for the transmission of a fluid, either liquid or gaseous.

A light operated controlling means of the character involved in my invention comprises as an essential feature two members adapted to have relative movement with respect to each other due to unequal expansion thereof under the influence of light. One of these members, which may be regarded as the primary member, is exposed to light rays which it absorbs and converts into heat whereas the other, which may be regarded for purposes of description as the secondary or compensatory member, should be prevented from absorbing light either by excluding the light therefrom or else in some other way preventing it from absorbing light, as by forming its surface of a character to reflect the light rays and not absorb them. The greater the difference in expansion between the two members the more efficient will the apparatus be.

In the practical construction of a light controlled device embodying my invention it is necessary that the so-called primary and secondary members shall be so related and connected to each other that the unconnected end portions thereof shall be relatively immovable or stationary under the influence of ordinary atmospheric temperature while the opposite connected end portions thereof shall move as a result of the expansion due to such atmospheric temperature through equal distances and in the same direction. It is necessary to establish this relationship in order that the part or parts to be actuated and controlled shall not be affected by the expansion of the said members due to atmospheric temperature or heat as contra-distinguished from the temperature resulting from the absorption of light.

A general object of my invention is to rearrange or redistribute the various parts of a light operated controlling means or apparatus in such manner as to increase and improve its efficiency and cheapen its construction; and also to render it more adaptable for use in the opening and closing of conduits of various kinds such as electric, liquid or gaseous.

As already indicated the greater the differential of expansion between the so-called primary and secondary members the greater the efficiency of the device and such differential of expansion is controlled by the difference in temperature between the said two members due to the influence of light; hence, a further object of the invention is to provide means whereby a maximum difference of temperature due to the influence of light and a maximum differential of expansion may be effected between the said members.

A further object of the invention is to provide a connection between the said two members of such character that the secondary member may be situated within the primary member and thereby shielded from light rays whereby the maximum difference in temperature between the said two members due to the influence of light may be produced.

A still further object of the invention is to provide means whereby undue dissipation of heat produced in the primary member by the influence of light rays thereon may be prevented; and also to provide means to facilitate the dissipation of the heat from the secondary member to thereby aid in the establishment of a maximum difference of temperature between the two members.

A still further object of the invention is to provide an improved and novel supporting means for the primary member and also a novel intermediate means for transmitting the movements of the primary member due to differential expansion between the same and the secondary member to the part or parts to be actuated.

Without undertaking at this time to point out all the various objects and advantages of my invention I shall now proceed to a detailed description of the same in which description additional objects and advantages will be pointed out or will be apparent. In order that the invention may be readily understood and its practical advantages fully appreciated reference may be had to the accompanying drawing in which certain forms of embodiment thereof are shown. However, it will be understood that the invention is susceptible of embodiment in other forms of construction than that shown and that changes in the details of construction may be made within the scope of the claims without departing from the said invention.

In the drawings:

Fig. 1 is a central vertical longitudinal sectional view of an apparatus embodying my invention;

Fig. 2 is a vertical sectional view of a portion of said apparatus, different portions of which are taken in different slightly spaced parallel planes at right angles to the plane in which Fig. 1 is taken;

Fig. 3 is a transverse sectional view taken on the line 3—3 of Fig. 1 with the cover and certain other parts removed;

Fig. 4 is a view indicating an electric circuit which is adapted to be controlled in the construction as illustrated in previous Figs. 1 to 3;

Fig. 5 is a bottom plan view of a portion of the structure showing more clearly a detail of construction; and Fig. 6 is a vertical sectional view of a portion of apparatus taken in a plane similar to that in which Fig. 1 is taken but showing a slightly modified construction.

Referring to Figs. 1 to 4 of the drawings: 1 designates the body portion of the casing provided with a bottom 2 having openings therethrough. The body portion of the casing 1 is provided with an opening in one side thereof which is adapted to be closed by means of a door 3. The upper portion of the casing 1 is extended inwardly as indicated at 4 and the inner edge of such extension is rabbeted as indicated at 5. A base member 6 is provided with a flange-like portion 7 which rests upon the bottom shoulder of the said rabbeted portion. The base portion 6 is provided at its center with upwardly and downwardly extending projections 10 and 11 through which and through the said base an opening extends, the upper portion 12 of which is of less diameter than the lower portion 13 thereof. The upper outer edge portion of the projection 10 is rabbeted as indicated at 14 and the lower end of a tube 15 of aluminum or other suitable metal rests within the said rabbeted portion upon the lower shoulder thereof. A plug 17 is situated in the upper end of the said tube. The lower portion of the said plug is of slightly less diameter than the interior diameter of the said tube while the portion thereof adjacent the upper end of said tube is of a diameter equal to the interior diameter of the said tube. The said plug is provided with a lateral annular flange portion 18 which rests upon the upper end of the said tube. A rod 20 of steel or other suitable metal is connected at its upper end, as indicated at 21, to the lower end of the plug 17. The lower end portion of the said rod extends downwardly through the holes comprising the parts 12 and 13 and is provided adjacent its lower end with a collar 22 which is secured in place by means of a pin 23. A wire 24 is coiled about the lower end portion of the said rod 20 and bears at its lower end against the collar 22 and at its upper end against the shoulder at the upper end of the enlarged opening 13. This wire constitutes an expansion spring which presses or pulls the rod 20 downwardly so as to draw the flange 18 upon the plug 17 against the upper end of the tube 15.

A short rod 25 of steel or other suitable metal is adjustably secured at its lower end in an opening in the upper end portion of the plug 17. This rod extends upwardly through an opening 26 at the center of a shallow plug or disk like member 28 having a lateral flange like portion 29, the lower side of which rests upon the upper end of a tube 30 of copper or other suitable metal which is light absorbing. To render it more efficient as a light absorbing member it is blackened by covering it with a coating of black material, such as lamp black. The plug or disk like member 28 is provided with openings 31 for ventilation purposes. The opening 26 is provided with a flared or inverted truncated cone-shaped portion 35 at its upper end against which is seated the rounded or globular surface of a contact washer or collar 36.

It is desirable that the washer or collar 36 shall make line contact, as shown, with the truncated cone-shaped surface 35 in order that the path through which there may be an interchange of temperature between the members 15 and 30 may be reduced to a practical minimum. In order to still further reduce the dissipation of heat from the member 30 its inside surface is insulated with a coat of paint. The so-called primary member 30 is supported at its lower end upon a ring-shaped or annular member 40, the upper outer edge of which is rabbeted or grooved as indicated at 41. The lower end of the member 30 is situated in this groove as is clearly shown in the drawing. The ring-shaped or annular member 40 is provided with downwardly extending pointed pins 42, which are situated in diametrically opposed relation with respect to each other, as clearly shown in Fig. 2 of the drawings. The pointed end of one of these pins is seated in an inverted cone-shaped depression 43 and the other in a wedge-shaped notch 44 of a Cardan ring 45. This ring in turn is supported upon the upwardly projecting pointed ends of pins 46. The pointed upper end of one of the pins 46 is situated in a cone-shaped depression 48 while the other is situated in a wedge-shaped notch 49, both of which are located in the underside of the Cardan ring 45 in a plane in diametrically opposed relation with respect to each other at right angles to the plane in which the pointed ends of the pins 42 are situated. The pins 46 are carried by a ring-shaped or annular member 50 which is provided in its underside with a cone-shaped depression 51 and a wedge-shaped notch 52. The said ring-shaped member 50 is supported upon the upper pointed ends of pins 55 situated in diametrically opposed relation to each other in a plane at right angles to the plane of the pin 46. One of the pins 55 projects into the depression 51 and the other one into the wedge-shaped notch 52, as shown in Fig. 2 of the drawing. The pins 55 are secured in the upper ends of plugs 56 which in turn are adjustably secured in the base member 6. The plugs 56 in the construction shown consist of members separate from the pins 55. The pins 42, 46 and 55 as well as the members supported thereby should be of hard metal. It will be noted that the points of the several pairs of pins are situated in horizontal planes, which are quite close together, and, if desired, the arrangement may be such that all of the said points would occupy positions in the same horizontal plane.

The points of the pins 42 and 55 are situated in planes slightly spaced from each other as shown in Fig. 1 of the drawings. These planes are parallel with each other as already indicated. By positioning the pins 42 and 55 with respect to each other in the manner as indicated in Fig. 1 of the drawings it will be apparent that a leverage relationship exists between the said couples of pins. The ring-shaped member 40 being supported by means of the pins 42 upon the Cardan ring 45 is adapted to adjust itself to the lower end of the tube 30 so that the latter will seat firmly upon the horizontal shoulder of the groove 41.

The base member 6 is provided with a depression or shallow opening 59 in its upper side in which is seated the lower end of a coiled expansion spring 60. The upper end of said spring is seated in a depression or shallow opening 61 in the underside of the left hand portion (having reference to Fig. 1 of the drawings) of the annular member 50. The spring 60 tends to expand and acting through the members 50 and the Cardan ring 45 exerts upward pressure against the pointed pins 42, which pressure is transmitted through the tube 30 to the contact washer or collar 36 and from the latter through the rod 25 to the rod 20. The latter is being pulled downwardly by the spring 24. Such downward pulling exerts compressive pressure upon the tube 15. It will be seen, therefore, that the action of the spring 60 is to reduce compressive pressure which is adapted to be exerted by the spring 24 upon the tube 15. In actual practice these pressures should be adjusted so that the pressure per square centimeter of the cross-sectional area of the tubes 15 and 30 shall be equal.

The annular lever member 50 is provided at a point in opposed relation to the spring 60 with a contact member 65, the said contact member being secured to the member 50 by means of a binding screw 66. A strip 67 is likewise secured in position upon the member 50 by means of the said binding screw 66. The purpose of the strip 67 is to facilitate the connection of an electrical conductor 70 to the contact 65. Washers 71 and 72 of insulating material are interposed between the members 65 and 67 and the annular lever member 52 and the binding screw 66 in order that the current intended to flow through the circuit including the conductor 70 shall not be short circuited through the apparatus. The contact member 65 is adapted to contact with the upper end of a contact member 80 having screw threaded connection with base member 6. By turning or rotating the member 80 it may be adjusted vertically toward and from the contacting portion of the contact member 65. For the purpose of indicating the extent of rotation of the adjustable contact member 80 disk like member 81 is secured to the lower end thereof in convenient position with respect to the door 3 which member is provided with a scale with which a pointer 82 is adapted to co-operate. The said pointer consists of a projection extended from a plate 83 having a central opening through which the member 80 extends. The said plate is secured to the underneath side of the base 6 by means of headed screws 84, one of which constitutes a binding screw for securing and binding an end of the conducting wire 85 to the said base member 6. The said plate 83 is provided with a bent spring projecting portion 87 which is adapted to contact with the upper side of the disk 81 so as to hold the same in any position to which it, together with the adjustable member 80, may be adjusted or positioned.

The conductors 70 and 85 are connected at their opposite ends to binding posts 90 and 91 carried by a block 92ª secured within the casing 1. These binding posts are connected by connecting bars 92 and 93 to binding posts 94 and 95 upon a block 95ª to which the conductors 96 and 97 are connected. The opposite ends of these conductors are connected to the opposite sides of a battery 98. The work to be done by the current flowing through the circuit it indicated in the form of an electric light at 100, although it will be understood that a relay, motor, or the like may be substituted for the light.

In order to control and reduce to a minimum the dissipation of heat from the primary tubular member 30 the said member together with the tubular member 15 and the connections between the same is inclosed within a tubular member 101 of glazed glass which permits the passage of light rays but excludes ordinary heat rays. The presence of this tubular glass member prevents the contact of wind currents against the exterior surface of the primary member 30 and thereby tends to prevent the dissipation of the heat therefrom. The tubular glass member 101 is supported upon the upper end of a cover 102 which is secured to the upper side of the inwardly turned portion 4 of the casing of the apparatus by means of screws (not shown) which engage the topped openings 103. The lower end portion of the said tubular glass member 101 is embedded within a suitable cementitious material 104 which is situated within a groove upon the inner side of the upper portion of the cover 102.

A top cover comprising the parts 110 and 111 is supported upon the upper end of the tubular glass member 101. The part 111 is secured by means of rivets to the underside of the part 110 and depends in the form of a flange, as shown, and surrounds the upper portion of the said tubular member 101, cementitious material 112 being provided for securing the cover to the upper end of said tubular glass member. The portion of the cover 111 is provided with ventilating openings 113, as shown. The portion 110 of the cover is provided at its outer edge with a depending flange like portion 114 which surrounds the depending flange like portion of the part 111 of the cover. A downwardly extending and depending hook like portion 115 is secured to the outer portion of the part 110 of the cover, as is shown in Fig. 1 of the drawings. The tubular glass member 101 is protected by a wire screen like structure 116, the upper end of which projects into the space between the depending portion of the extension 115 and the depending flange like portion 114 of the cover part 110. The lower end of the said screen like member is supported within the side walls of an annular member 117 having an inturned flange 118, the inner edge of which is seated against and is supported upon the upper portion of the cover 102.

The air which enters the openings through the bottom 2 of the casing 1 passes upwardly through a screened opening 120 in the base member 6 of the apparatus and escapes from the upper part of the apparatus, after having passed upwardly through the tubular members 15 and 30, through the ventilating openings 113.

In the setting up and operation of the device, as illustrated in Figs. 1 to 4 inclusive, the contact 80 is adjusted so as to properly position the same with respect to the contacting end of the contact 65. Such adjustment having been made and the various parts having been assembled and connected together in the manner indicated in the drawing, the apparatus is ready for practical use.

Upon subjecting the apparatus to the action of light the light rays pass through a glazed tubular glass member 101 while the ordinary heat rays are excluded. The light rays strike or impinge upon the exterior surface of the tubular primary member 30 and are absorbed and converted into heat. The tubular member 15, however, is not only light reflecting but the light rays are excluded therefrom so that it is prevented from absorbing such rays. The increase in the temperature of the tubular primary member 30 causes expansion thereof and such expansion effects downward movement of its lower end. Such downward movement operates through the members 40 and 45 to tilt the member 50 toward the left about its fulcrum points so as to break the contact between the contact members 65 and 80. Upon breaking these contacts the flow of current through the electric circuit is interrupted and the work which is being performed by the current, such as the lighting of an electric light, the operation of a relay, a motor, etc., is interrupted or discontinued. It will be seen, therefore, that in the construction and operation as thus far described, the circuit remains broken or open during the daylight or if subjected to artificial light is retained or held in open position. In the absence of light, as when apparatus is subjected to the darkness of the night, the member 30 contracts so that the spring 60 is permitted to cause pivotal movement of the member 55 toward the right to thereby cause the contact member 65 to contact with the member 80. The circuit is thereby completed or closed so that current may flow therethrough.

By reason of the fact that the compensating member 15 is situated within the tubular primary member 30 and of the further fact that means is provided for producing a maximum differential of temperature between the two members 15 and 30 under the influence of light it will be seen that I have provided means whereby a maximum differential of expansion between the two parts is effected so that an apparatus of great efficiency and certitude in action is produced. As already indicated a variation of the temperature of the two members 15 and 30 due to ordinary atmospheric heat does not cause differential of expansion or contraction, but under the influence of such heat they contract and expand equally and in the same direction. The lower ends at such time remain stationary and the movement due to such expansion and contraction is manifested at the tops of the said members 15 and 30.

In the construction as illustrated in Figs. 1 to 4 inclusive and as thus far described, the apparatus is illustrated as controlling the opening and closing of a conduit or circuit for the passage of electric current, but, as previously indicated herein, the said apparatus is adapted for use not only in the controlling of electric conduits or circuits but also for controlling conduits for the passage of fluids, such as gases or liquids. In Fig. 5 of the drawings I have illustrated a construction adapted to the latter purpose. In said Fig. 5 the reference numbers 6, 10, 11, 12, 13, 15, 20, 22, 23, 24, 30, 40, 41, 42, 43, 44, 45, 46, 48, 49, 50, 51, 52, 55, 56, 102, 104, and 120 are identical with the parts correspondingly numbered in the preceding figures of the drawings.

In the construction as shown in the preceding figures of the drawings the vertical plane in which the points of the pin members 42 are situated is situated to the left of the vertical plane in which the points of the pins 55 are situated whereas in Fig. 5 of the drawings the points of said pins are situated in the reverse position or relation with respect to each other.

In the construction shown in Fig. 5 the base 6 is supported upon posts or columns 125, only one of which is shown.

The base member 6 is provided with an opening 126 within which the inner end of a pipe 127 is secured. Leading from the opening 126 is a passageway 128 leading into an opening 129 in the said base which opening is adapted to be closed by a plug 130, the upper or inner end of which has screw threaded connection with the lower or outer enlarged end portion of the opening 129. The said plug is provided with an enlarged opening 132 in its outer end in which is secured the inner end of a pipe or conduit 133. A small passageway 134 through the upper or inner portion of the plug 130 connects the openings 129 and 132. The plug 130 is provided with a flange like projection 135 at its upper or inner end which surrounds the inner end of the passageway 134 and constitutes a valve seat. A valve 140 is adapted to be moved into and out of contact with the said valve seat to control the passage of a fluid, whether liquid or gas, through the passageways through the base member 6 and the plug 130. In the construction as shown, the fluid is indicated by the arrows as flowing from the pipe or conduit 127 through the passageways and openings in the base member 6 and from the latter through the pipe or conduit 133. However, if desired, the direction of flow may be the reverse of that indicated by the arrows. The upper portion of the opening 129 is closed by means of a flexible diaphragm 141 through which the stem 142 of the valve 140 extends. The said stem is provided with washer like plates 143 which are situated upon opposite sides of the diaphragm 141 and secure the said stem to the said diaphragm. An expansion spring 145, which is situated within the opening 129, is coiled around the inner or lower portion of the stem 142 and around the valve seat 135. Its lower end is seated against the upper or inner end of the plug 130 while its upper end is seated against the inner or underside of the inner or underneath washer like member 143. The said spring being an expansion spring and being in contact with the inner or underneath washer 143 tends to cause upward movement of the diaphragm 141 and of the valve stem and valve secured thereto to open the valve 140. In the presence of light, at which time the primary member 30 is in an expanded condition as above described, the right hand side of the annular lever member 50 is depressed. The said member 50 is provided with a laterally extending projection 147 secured thereto by means of a screw 148. The said projection is in contact with the upper end of the valve stem 142, and, at such time as the primary member 30 is in an expanded state due to the action of light thereon, presses the valve 140 against the valve seat 135 to close the passageway through the base member 6 so as to prevent the flow of fluid through the pipes 127 and 133 and the said passageway. However, if the apparatus is in darkness or if there is an absence of light the member 30 contracts or is in a contracted state so that the spring 145 is permitted to press the diaphragm 141 and the valve connected therewith upwardly so as to open the passageway through the base member 6 and to permit a flow of fluid therethrough. If such fluid is gas it may be conducted to the burner of a lamp or other device where it may be ignited.

In the constructions as shown and described, the contact member 65 and the valve 140, in the absence of light, remain constantly open so that the work to be performed is continuous, but, if desired, a flashing apparatus of known construction may be employed in association with the apparatus as disclosed herein for the purpose of interrupting at intervals the flow of electric current or of gaseous or liquid fluids through the conduits provided therefor.

It will be seen that by my invention I have provided a construction and arrangement of such character and possessing such characteristics that a maximum of temperature differential between the primary and secondary members 30 and 15 due to the action of light on the member 30 may be produced with resulting maximum differential of expansion.

I am enabled, therefore, to produce an apparatus possessing the highest degree of efficiency in operation.

Having thus described my invention, what I claim and desire to secure by Letters Patent is:

1. In a light operated controller, the combination of two bodies which are adapted to expand and contract unequally under the influence of light and darkness, which bodies are situated one within the other, a member to be actuated by such unequal expansion and contraction, and means whereby such unequal expansion and contraction cause movement of said member.

2. In a light operated controller, the combination of two tubular bodies which are adapted to expand and contract unequally under the influence of light and darkness, which bodies are supported concentrically with respect to each other.

3. In a light operated controller, the combination of two tubular bodies which are adapted to expand unequally under the influence of light, which bodies are situated one within the other, and means for operatively connecting the outer ends of said bodies, means for stationarily supporting the inner end of one of the said bodies, and means for movably supporting the inner end of the other of said bodies.

4. In a light operated controller, the combination of two bodies situated one within the other, which bodies are adapted to expand unequally under the influence of light, means for operatively connecting the outer ends of said bodies, means for stationarily supporting the inner end of one of said bodies, a member to be actuated, and means intermediate the said member and the inner end of the other of said bodies whereby the expansion thereof operates said means to effect actuation of said member.

5. In a light operated controller, the combination of two bodies situated one within the other, the outer one of which is light absorbing while the inner one of which is light reflecting, means adapted to exert pressure upon one of said bodies longitudinally thereof, means adapted to exert pressure in the other direction upon the other of said bodies, means whereby the last mentioned means operates to relieve a portion of the pressure exerted by the first mentioned means upon the body associated therewith, a member to be actuated, and means intermediate the said member and the said light absorbing body whereby the unequal expansion of the latter with respect to the other of said bodies operates to cause movements of said member.

6. In a light operated controller, the combination of two tubular bodies, one situated within the other, the inner one of which is light reflecting and the other one of which is light absorbing, a stationary support for the former, a leverage support for the latter, and a member which has connection with and which is adapted to be actuated by said leverage support.

7. In a light operated controller, the combination of two tubular bodies, one of which is situated within and concentrically of the other, the inner of said bodies being light reflecting while the other thereof is light absorbing, a stationary support for the inner body, a movable support for the outer body, a conduit, and a movable member having connection with the said movable support whereby upon relative movements of the said bodies the said movable support is moved to cause movement of said member.

8. In a light operated controller, the combination of two tubular bodies one situated within the other and one of which is light absorbing and the other of which is light reflecting, a stationary support for the latter, a pivoted support for the former, a member to be actuated, and means intermediate the said member and the said movable support whereby movement of said support is adapted to cause movement of the said member.

9. In a light operated controller, the combination of two tubular bodies, one of which is situated within and concentrically of the other, the outer of said bodies being adapted to become heated to a greater extent than the other under the influence of light, a stationary support for the inner body, an annular member upon which the lower end of the outer tubular body rests, pivoted leverage members for supporting said annular member, one of said pivoted members consisting of a Cardan ring, a member to be actuated, which member has connection with one of the said pivoted members, substantially as described.

10. In a light operated controller, the combination of two tubular bodies, one situated within the other, the outer one of which is adapted to become heated to a greater extent under the influence of light than the inner one, a stationary support for the inner member, a movable support for the outer member, means for exerting downward pressure upon the outer end of the inner member, means for exerting pressure in the opposite direction upon the outer member, connection between the said outer member and the first named pressure exerting means whereby a portion of the pressure of the said means is released from the outer end of the said inner member, and a member to be actuated, which member has connection with the movable supporting means of the said outer member.

11. In a light operated controller, the combination of two tubular bodies, one of which is situated within and concentrically of the other, the outer of which bodies is adapted to expand and contract to a greater extent under the influence of light and darkness than the other of said bodies, a stationary support for the inner of said bodies, a movable support for the outer of said bodies, means for operatively connecting the said bodies, a member to be actuated, and means intermediate the said member and the outer of said bodies whereby the unequal expansion and contraction of said bodies is adapted to cause movement of said member.

12. In a light operated controller, the combination of two tubular concentric bodies, one of which is situated within the other, the outer of said bodies being light absorbing and the other being light reflecting, a casing surrounding said bodies a portion of which is transparent, and means whereby ventilation of the interior of said casing may be effected.

13. In a light operated controller, the combination of two tubular bodies, one situated within the other, the outer one of which is light absorbing, a stationary support for the inner body, a Cardan ring for supporting the other of said members, a pivoted annular lever for pivotally supporting said ring, yielding means for exerting pressure through the said lever and Cardan ring against the said body supported thereby, a conduit, and a member having connection with said pivoted annular lever for opening and closing said conduit.

14. In a light operated controller, the combination of bodies which are adapted to expand unequally under the influence of light, the body which expands least under such influence being shielded from the light, a conduit, a member for controlling said conduit, and means intermediate the said bodies and said member whereby the unequal expansion thereof causes movement of said member to control said conduit.

15. In a light operated controller, the combination of primary and secondary bodies which expand unequally under the influence of light, an electric circuit comprising contacts, one of which is adjustable and the other one of which is oscillatable, and a leverage means, comprising a Cardan ring, interposed between the said contacts and the said primary body, the said leverage means carrying the said oscillatable contact.

16. In a light operated controller, the combination of primary and secondary members which expand unequally under the influence of light, the primary member expanding to a greater extent than the secondary member, yielding means for exerting pressure upon the secondary member longitudinally in one direction, said means also being adapted to exert pressure in a like direction upon the primary member, stationary means for supporting the lower end of the secondary member, movable means for supporting the lower end of the primary member, yielding means acting through said movable means for exerting pressure in the opposite direction upon said primary member and thereby relieving a portion of the pressure upon the secondary member, a conduit, and means actuated by said movable means for controlling said conduit.

17. In a light operated controller, the combination of two tubular bodies, one of which is situated within and concentrically of the other, and both of which are provided with plugs situated in their upper ends, which plugs have portions bearing upon the upper edges thereof, which bodies expand unequally under the influence of light, the outer body expanding under such influence to a greater extent than the inner body, stationary means for supporting the inner body, movable means for supporting the outer body, a rod extending upwardly through the inner body and having connection with the plug situated in the upper end thereof, yielding means for exerting downward pressure upon the said plug, a connection between the said plug and the plug situated in the upper end of the outer body, yielding means operating through the said movable means for exerting upward pressure against the said outer body, and a member adapted to be actuated by the movements of the said movable means.

18. In a light operated controller, the combination of bodies which expand unequally under the influence of light, a stationary support for the body which expands least under such influence, movable means for supporting the other of said bodies, the said means comprising an annular lever, stationary points for pivotally supporting the said lever, a Cardan ring supported upon said annular lever, and an annular member pivotally supported upon said Cardan ring, a conduit, and a member having connection with the said annular lever for controlling said conduit.

In testimony that I claim the foregoing as my invention, I have hereunto signed my name this 22 day of May A. D., 1922.

ELOF H. MEDÉN.